(12) United States Patent
Pajukoski et al.

(10) Patent No.: US 7,688,774 B2
(45) Date of Patent: Mar. 30, 2010

(54) INTERFERENCE CANCELLATION IN RADIO SYSTEM RECEIVER

(75) Inventors: Kari Pajukoski, Oulu (FI); Kari Horneman, Oulu (FI); Jukka Nuutinen, Oulu (FI)

(73) Assignee: Nokia Corporation, Espoo (FI)

( * ) Notice: Subject to any disclaimer, the term of this patent is extended or adjusted under 35 U.S.C. 154(b) by 1429 days.

(21) Appl. No.: 10/351,588

(22) Filed: Jan. 27, 2003

(65) Prior Publication Data

US 2003/0142640 A1    Jul. 31, 2003

(30) Foreign Application Priority Data

Jan. 28, 2002    (FI)    .................... 20020154

(51) Int. Cl.
H04B 7/212    (2006.01)
H04B 1/00    (2006.01)
H04L 27/04    (2006.01)

(52) U.S. Cl. .................. 370/321; 455/63.1; 375/347

(58) Field of Classification Search .............. 370/332, 370/320–321, 336–337, 345, 347, 441–442; 375/130, 148, 346, 348, 227, 347; 455/278.1, 455/296, 501, 226.3, 232.1, 283, 63.1–63.2
See application file for complete search history.

(56) References Cited

U.S. PATENT DOCUMENTS

| | | | |
|---|---|---|---|
| 5,402,523 A | 3/1995 | Berg | |
| 5,649,303 A | 7/1997 | Hess et al. | |
| 6,002,673 A * | 12/1999 | Kahn et al. | 370/252 |
| 6,115,409 A * | 9/2000 | Upadhyay et al. | 375/144 |
| 6,400,704 B2 * | 6/2002 | Mikuni et al. | 370/347 |
| 6,493,541 B1 * | 12/2002 | Gunnarsson et al. | 455/69 |
| 6,529,545 B2 * | 3/2003 | Tiirola et al. | 375/148 |
| 6,600,447 B1 * | 7/2003 | Molnar | 342/378 |
| 6,665,288 B1 * | 12/2003 | Ottosson et al. | 370/342 |
| 6,694,154 B1 * | 2/2004 | Molnar et al. | 455/562.1 |
| 6,731,622 B1 * | 5/2004 | Frank et al. | 370/342 |
| 6,778,592 B1 * | 8/2004 | Haga et al. | 375/148 |
| 6,810,073 B1 * | 10/2004 | Karlsson | 375/144 |
| 6,879,823 B1 * | 4/2005 | Raaf | 455/414.1 |
| 6,952,589 B1 * | 10/2005 | Mantha | 455/501 |
| 6,987,750 B2 * | 1/2006 | Soderkvist et al. | 370/337 |
| 6,993,002 B2 * | 1/2006 | Pan et al. | 370/335 |
| 7,031,411 B2 * | 4/2006 | Arslan et al. | 375/346 |
| 2002/0003782 A1 * | 1/2002 | Pan et al. | 370/280 |
| 2002/0071508 A1 * | 6/2002 | Takada et al. | 375/346 |
| 2003/0036358 A1 * | 2/2003 | Pan | 455/63 |
| 2003/0053524 A1 * | 3/2003 | Dent | 375/148 |

FOREIGN PATENT DOCUMENTS

EP    0 964 530 A1    12/1999

OTHER PUBLICATIONS

Finnish Search Report dated Sep. 26, 2002.

* cited by examiner

*Primary Examiner*—Aung S Moe
*Assistant Examiner*—Redentor M Pasia
(74) *Attorney, Agent, or Firm*—Alston & Birch LLP

(57) ABSTRACT

An arrangement for cancelling interference from a received signal, comprising: a first radio system and a second radio system employing a time slot structure in data transmission and operating on at least partly the same geographical area as the first radio system. A receiver of the first radio system is configured to control the cancellation of interference from the received signal on the basis of the timing employed in the time slot structure of the second radio system.

31 Claims, 3 Drawing Sheets

INTERFERENCE CANCELLATION IN RADIO SYSTEM RECEIVER

BACKGROUND OF THE INVENTION

1. Field of the Invention

The invention relates to interference cancellation in a receiver operating in a radio system.

2. Description of the Related Art

With increasing numbers of mobile communication systems and their users, there is a growing demand for placing the systems on overlapping or at least nearby frequencies. In other words, guard bands between the systems must be narrowed. This inevitably leads to a potential increase of interference between the radio systems, which will have to be taken into account in system design.

One way of cancelling interference in radio systems implemented using spread spectrum technology is the IRC method (Interference Rejection Combining), in which receiving antennas are suitably weighted in an attempt to obtain an optimal result regarding the quality of the signal to be detected. However, the weighting of antennas does not provide a satisfying solution in a situation in which signal detection is interfered by a signal originating from another radio system. The situation can be illustrated with FIG. 1, where two radio systems operate within the same geographical area. A base station 100 belongs to a first radio system and serves a terminal 104. A base station 102, in turn, belongs to a second radio system and serves a terminal 106. The terminal 106 located in the coverage area 110 of the base station 100 is far away from its serving base station 102 and therefore has to use high transmission power. Upon reception at the base station 100, the terminal 104 using low transmission power experiences significant interference caused by the transmission of the terminal 106 belonging to the second system.

It is therefore obvious that there is a need to develop a solution for signal reception that allows radio systems to be placed on adjacent and overlapping frequencies, without the transmissions of the neighbouring systems interfering unreasonably with each other.

SUMMARY OF THE INVENTION

It is therefore an object of the invention to present an improved method for cancelling interference in a radio system. This is achieved by a method for cancelling interference in a radio system, comprising: receiving a signal in a first radio system, a second radio system that employs a time slot structure in data transmission operating on at least partly the same geographical area as first system. The method further comprises controlling the cancellation of interference from a signal to be detected in the first radio system on the basis of the timing employed in the time slot structure of the second radio system.

The invention further relates to an arrangement for cancelling interference from a received signal, comprising: a first radio system and a receiver in the first radio system, the receiver comprising means for receiving a signal and the arrangement comprising a second radio system employing a time slot structure in data transmission and operating on at least partly the same geographical area as the first radio system. The receiver comprises means for controlling the cancellation of interference from the received signal on the basis of the timing employed in the time slot structure of the second radio system.

The invention thus relates to a method and receiver for receiving a signal in a radio system, such as a mobile communication system. The solution of the invention is directed to situations where two radio systems operate in the same geographical area. The invention can also be applied in situations where the two radio systems operate on at least partly the same frequency area. In one example the first radio system is a third generation WCDMA (Wideband Code Division Multiple Access) system and the second system is a radio system employing the TDMA (Time Division Multiple Access) method, such as the GSM (Global System for Mobile Communication). Both systems operate on a frequency range of about 1900 MHz. It is also possible that the first radio system is a TDMA system, i.e. the invention is not restricted to the first radio system being a spread spectrum system.

According to the invention, interference cancellation is controlled in the first radio system on the basis of the time slot structure of the second radio system. This means that a signal received at the first radio system is used for estimating the time instant of a time slot of the second radio system. In the WCDMA-GSM case used as an example, the narrowband signal of the GSM system is distinguished from the wideband signal in the form of a significant power peak. During a TDMA burst, the signal power may be as much as 60 dB higher than the power of a signal detected in the WCDMA system. In one embodiment, the time slot of an interfering system is located by searching the received signal for a time shift in the frame structures of the interfering system and the signal's own system and using the information in the interference cancellation. The power distribution of a received signal can also be compared with a TDMA ramp filter. The power distribution of the ramp filter provides a power profile substantially corresponding to the form of a TDMA time slot, i.e. the corners of the time slot are slightly rounded to reduce the interference caused by adjacent time slots to each other. For a terminal transmitting in the GSM system, for example, this means that the terminal will not use maximum transmission power at the beginning and end of the time slot. Instead, transmission power is progressively increased at the beginning of the time slot and, correspondingly, at the end of the time slot the power is reduced. In a WCDMA receiver, a filter with the above power profile is used and a time instant that provides the best compatibility is subjected to measures for cancelling interference.

The interference cancellation measure to be used may be implemented by suppressing the signal to be detected at a location where a time slot of the adjacent system is detected. According to one embodiment the method is applied together with the IRC interference cancellation method. The IRC is what is known as an optimal signal combining method based on antenna diversity. In the method, receiving antennas are weighted according to the spatial properties of a unwanted signal. The spatial properties of the unwanted signal are depicted in a covariance matrix, which is preferably re-computed in connection with the time slot of the adjacent system. In practice the re-computing of the covariance matrix thus allows the spatial information obtained from the interfering signal to be used, and the influence of an antenna directed towards an interfering terminal of the adjacent system can be reduced or even cancelled momentarily. According to an embodiment, a receiver, such as a WCDMA base station, of the first radio system knows a training sequence of the TDMA system, whereby a TDMA signal can be detected and its influence cancelled from the received signal.

The receiver of the radio system is preferably a RAKE-type receiver, which applies antenna diversity and in which a separate RAKE finger may be allocated to receive each multipath propagated signal component. The receiver of the invention is preferably implemented at a base station of the mobile communication system, because it is the most practical for implementing antenna diversity. The invention can also be implemented in a terminal enabling antenna diversity.

The invention provides significant advantages of quality for signal reception in a radio system in the geographical area of which there is operating another radio system employing the TDMA multiple access method.

BRIEF DESCRIPTION OF THE DRAWINGS

In the following the invention will be described in greater detail in connection with preferred embodiments and with reference to the accompanying drawings, in which.

DETAILED DESCRIPTION OF THE PREFERRED EMBODIMENTS

Figure 1:
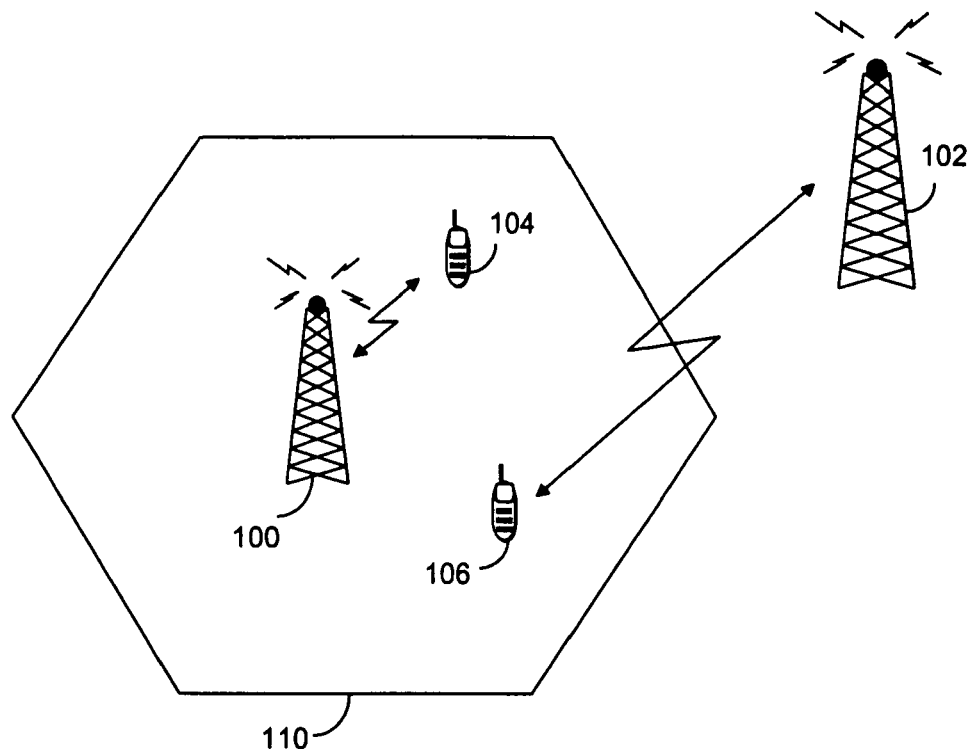
FIG. 1 illustrates the operation of two mobile communication systems in the same geographical area, as discussed above.

In the following, certain basic principles of the operation of a mobile communication system are discussed first, and then the preferred embodiments are described with reference to the accompanying Figures. In mobile communication systems information is transferred between a mobile communication network and a mobile station by means of data transfer resources. The data transfer resources of the mobile communication network are determined differently in different cases, depending on the multiple access method employed by the system. In radio networks using the FDMA (Frequency Division Multiple Access) method, the users are distinguished on the basis of the frequency they use. In a TDMA (Time Division Multiple Access) radio network there may be several users communicating on the same frequency band, where they are distinguished from one another in relation to time by dividing the information they transmit or receive into time slots. In a radio system employing CDMA (Code Division Multiple Access) several transmitting and receiving stations communicate simultaneously on the same radio spectrum frequency band. Each user is allocated a spreading code for the duration of the connection, and with the code the user spreads the information contained in his/her baseband signal. The receiver of the signal, in turn, is capable of identifying the information transmitted by the user by despreading it with the same spreading code. It is also possible to combine multiple access methods to implement a radio system. For example, in a hybrid system based on the TDMA and CDMA methods users communicating in each time slot are distinguished by means of spreading codes.

None of the above multiple access methods guarantees an ideal and interference-free radio connection between users and the mobile communication network. In the TDMA system, for example, users communicating in adjacent time slots and adjacent mobile communication system cells cause interference to one another. A disadvantage of the CDMA system, in turn, is that users operating on the same frequency band cause interference to each other's transmissions due to the unorthogonality of the spreading codes, among other things. In addition to the interference caused by the users to one another, the transmission of information on the radio path is subjected to interference caused by shapes of terrain, for instance. Multipath propagation means that when a user signal propagates it is reflected from various objects, causing several components of the same signal to be transmitted at different delays to the receiver. Multipath propagated components of a signal may cause fading, for example, in a situation where the signal is reflected from two nearby objects. When a significant fading occurs, the signal cannot be received at all. Interference may be caused to a radio transmission also by another radio system operating on a nearby, or even the same, frequency band, which is due to the increasing numbers of users and the consequent more efficient utilization of the frequency ranges. A solution that can serve as an example is the positioning of second and third generation mobile communication networks on the same frequency band, whereby the GSM system, for example, may cause high-power interference to a WCDMA system operating in the same area and possibly on the same frequency range.

A commonly used solution for a CDMA receiver is what is known as the RAKE receiver, which consists of one or more RAKE fingers, or correlators. The RAKE fingers are independent receiver units responsible for despreading and demodulating one received, multipath propagated signal component. Signals received from different RAKE fingers are combined in a receiver, whereby a better signal reliability is obtained. In addition to the RAKE fingers meant for signal reception, the receiver typically includes at least one separate searcher, which is responsible for generating an impulse response to a user signal to depict the different signal components of the user signal by means of delay and amplitude. The searcher typically employs a correlator, i.e. a matched filter (MF). A matched filter is used for example on a pilot channel or for information received in a pilot sequence of a radio burst. Pilot symbols consist of a set of symbols known by the receiver and the sender, and they allow the receiver of the information to form an estimated of the quality of the radio channel used, because the receiver knows what the received information should contain. The matched filter is slid across the received information by a half of a spreading code chip at a time, for example, and whenever the matched filter is synchronized with the received information, the reception power is measured. This allows an impulse response pattern to be formed for the multipath propagated components of the received radio channel, the pattern containing information about the signal power of the multipath propagated components and their delays.

Figure 2:
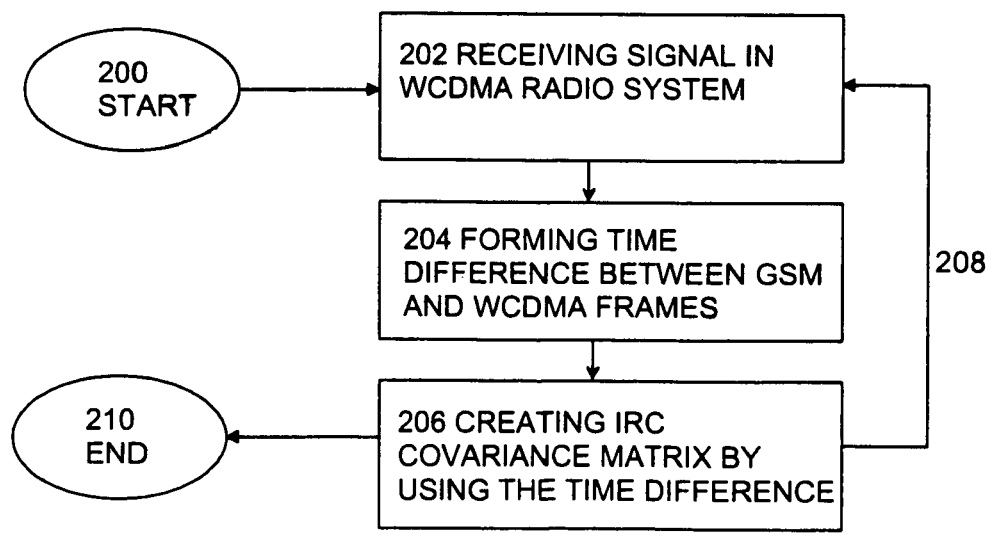
FIG. 2 illustrates a preferred embodiment of the method.

In the following, the preferred embodiments will be described with reference to the accompanying Figures. FIG. 2 shows a preferred embodiment of the method. In an initial step 202 of the method, a signal is received at a first radio system, such as a WCDMA system. The received signal contains a signal to be detected in the WCDMA system and an interference signal caused by a TDMA system operating in the same area. For the sake of clarity, it is assumed in the following that the WCDMA system is subjected to significant interference only from one TDMA terminal, as shown in FIG. 1. In that case, one time slot of a TDMA frame is allocated for uplink. However, it is obvious that the system can also be applied when there is a plurality of interfering TDMA terminals. It is further assumed, that in the method pattern of FIG. 2, the WCDMA receiver employs IRC interference cancella tion. Assuming that the WCDMA receiver has L receiver antennas in use, the received signal can be expressed with equation (1)

$$r=[r_1 r_2 \ldots r_L]^T. \quad (1)$$

Assume that the multipath propagated signal components can be detected by means of a code matched filter and the multipath propagated components are received through L receiver antennas. If a vector composed of the multipath propagated components and having the length of L is designated with $r_n$, the received symbol with s, a vector containing complex channel taps with $h_n$, and noise with $u_n$, then a $k^{th}$ sample of the despread, multipath propagated signal component can be expressed as shown in equation (2)

$$r_n(k)=h_n s(k)+u_n(k). \quad (2)$$

The spatial properties of unwanted signal components are depicted by the error covariance matrix expressed as equation (3)

$$R_{uu,n}(k)=E[u_n(k)u_n^H(k)], \text{ where} \quad (3)$$

E denotes a statistical expected value of the clause given in the brackets.

An optimal solution is depicted by the following weighting coefficient vector corresponding to a RAKE finger of a RAKE receiver $$w_n(k)=R_{rr}^{-1}(k)h_n, \quad (4)$$

where $R_{rr}$ represents a covariance matrix computed directly from the antenna signals, before despreading. In other words, in an IRC interference cancellation method used in a WCDMA receiver each RAKE finger preferably carries out spatial IRC filtering by using a plural number of receiving antennas and the weighting coefficients $w_n$ of equation (4).

Figure 3:
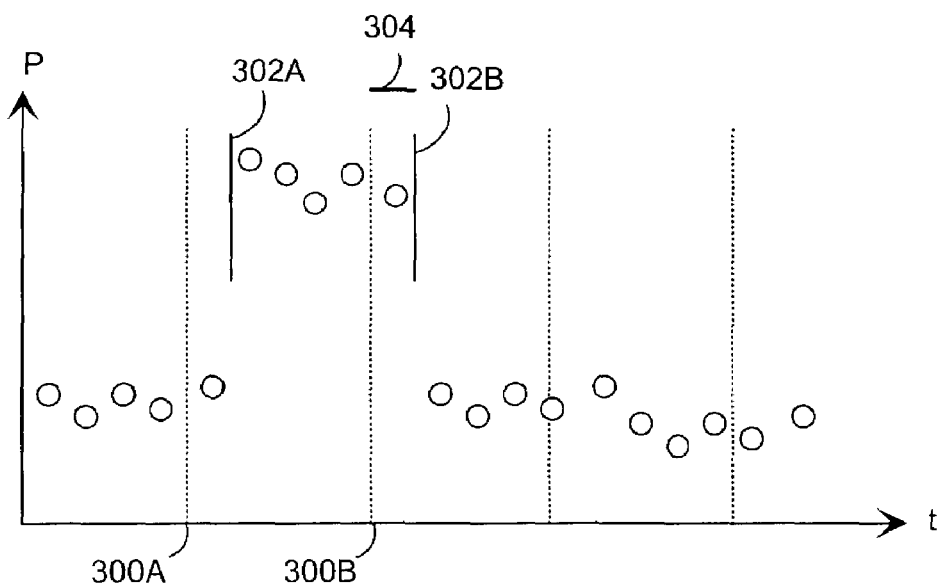
FIG. 3 illustrates the computing of a time difference between the frames of different systems.

In method step 204 shown in FIG. 2 there is formed a time difference between the transmission frames of the WCDMA and TDMA radio systems. The time difference is estimated on the basis of the power of a wideband signal measured in the WCDMA system. The TDMA transmission can be assumed to cause an interference level that may change between time slots, but remains constant during one TDMA time slot. A basic idea is to find the best compatibility between a wideband power measurement averaged for sequences having the length of a TDMA time slot and a power measurement averaged for averaging periods shorter than the TDMA time slot by varying the timing of the power measurement This principle is illustrated in FIG. 3, where broken lines 300A and 300B depict the limits of the WCDMA time slots on a time axis, while continuous lines 302A-302B depict the limits of the TDMA time slots. The position of a TDMA time slot in a received signal can be located by means of a power change in the received signal, because signal power changes significantly at a TDMA time slot. Samples taken from the power of the received signal are depicted by balls. The time difference between the WCDMA and TDMA time slots is illustrated by a time line segment 304. When the location of a TDMA time slot is to be determined, the time difference between the time slots of the different systems can be computed by means of formula (5), for example:

$$u = \operatorname*{argmin}_{u \in \{1, \ldots, M\}} \sum_{j=1}^{J/M} \Omega^u[j], \text{ where} \quad (5)$$

M is the length of the TDMA time slot, J is the length of the measurement window, and j is an index. Formula (5) includes the following costs function:

$$\Omega^u[j] = \sum_{n=1}^{M}\left(\frac{1}{M}\sum_{m=1}^{M} I_{wb}[(j-1)M+m+u] - I_{wb}[(j-1)M+n+u]\right)^2, \quad (6)$$

where $I_{wb}$ represents a wideband power vector that contains J/M previous wideband power values.

Figure 4:
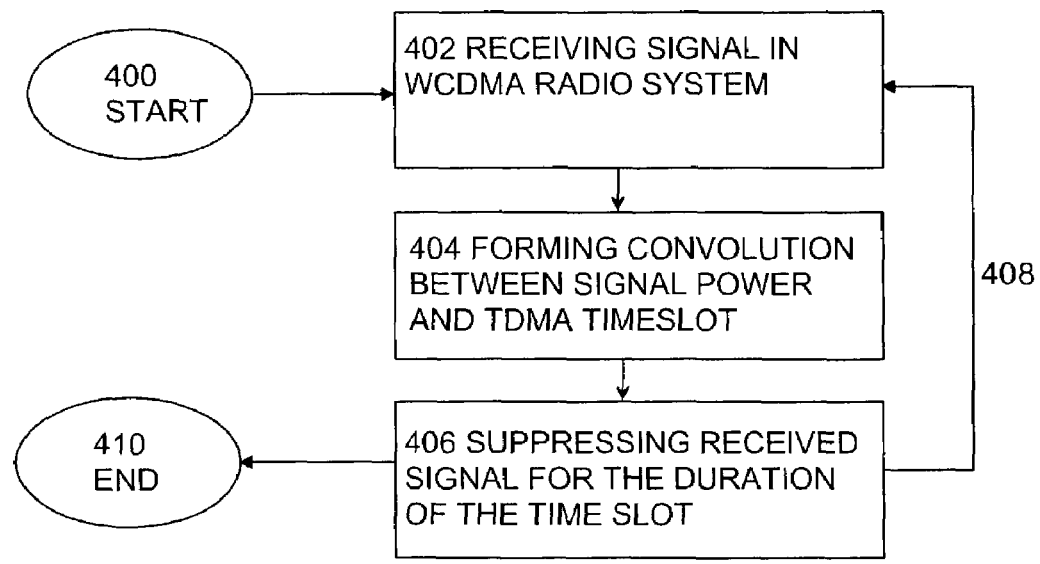
FIG. 4 illustrates a second preferred embodiment of the invention.

In step 206 the formed time difference is used in interference cancellation that takes place in the WCDMA system. The time difference is preferably used in the IRC interference cancellation method, in which the error covariance matrix is always re-generated in connection with an interfering TDMA time slot. FIG. 4 shows a second preferred embodiment of the method, which starts at step 400. Method step 402 depicts the reception of a signal in the WCDMA radio system, in the operating area of which there is also TDMA system. In the method, the location of a TDMA time slot causing the strongest interference is detected by forming a convolution between the wideband power and a TDMA ramp filter in step 404. The measurement window may have a length that is equal to that of the TDMA frame, for example. The method can be illustrated with formulae (7) and (8) 3 u=argmax u {1, , M}(u)(7).OMEGA.A.=sub.wb*I.sub.gsm (8).

F.sub.gsm is the ramp filter of the TDMA system. The power of the TDMA time slot that is estimated to cause the strongest interference is compared with the average power of the measurement window, the estimated most interfering TDMA time slot in the average power being ignored. The ratio of the average power of the measurement window to the power of the TDMA time slot exceeds a predetermined threshold, such as 3 dB, the use of the received signal will be restricted during the TDMA time slot causing the strongest interference. In step 406 its use can be restricted for example by decreasing the unfiltered channel estimate and symbol estimate values, or by otherwise restricting the received signal during the TDMA time slot causing the strongest interference. In one embodiment the values may be set at zero during the TDMA time slot of the strongest interference. At step 408, one or more of the operations performed in steps 402-406 may be used to compute and/or re-compute the covariance matrix. The operations then end at step 410.

Figure 5:
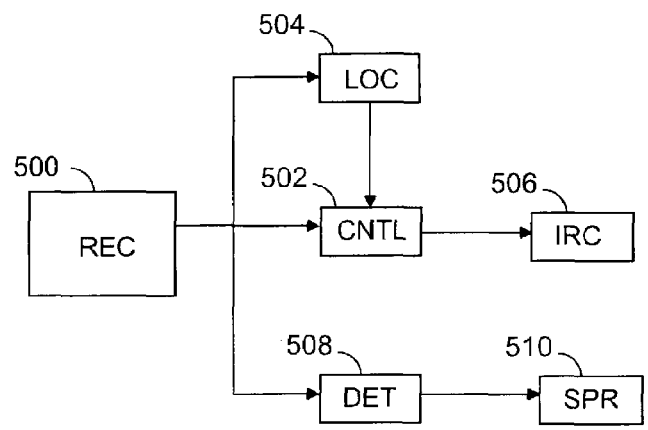
FIG. 5 illustrates a preferred embodiment of the invention.

FIG. 5 shows a receiver according to a preferred embodiment. The receiver comprises means for receiving 500 a signal. The receiving means 500 comprise for example receiving antennas, radio frequency parts, an A/D converter, filters, and means for measuring signal power. From the receiving means 500 the signal is supplied to means for controlling 502 the cancellation of interference and to means for locating 504. The control means 502 are configured, among other things, to control the interference cancellation according to the structure of the time slots in the interfering TDMA system. Interference cancellation is preferably controlled by utilizing information about the timing of the interfering TDMA system. The control means preferably store information about the length of the TDMA time slot, its frame structure and, when necessary, also about the training sequence in the TDMA system. The locating means 504 are configured to locate a time slot of the TDMA system in the received signal. The locating means 504 are configured to use the power profile of the signal in the locating. In an embodiment, the locating means 504 search the TDMA time slot for a time difference relative to the time slot structure in the system of the means. In another embodiment the aim is, in turn, to locate the timing of the TDMA time slot causing the strongest interference.

The receiver comprises IRC interference cancellation means 506, which co-operate with the control means 504. The IRC interference cancellation means are configured to implement the measures required by the IRC interference cancellation method, which include the updating of the covariance matrix on the basis of the information obtained from the control means 504. In one embodiment the receiver comprises means for detecting 508 a TDMA signal by using the training sequence and the frame structure information contained in the signal. According to another embodiment, a detected interference signal is suppressed by suppressing means 510. The suppressing means 510 also communicate with the control means 502 to enable the suppression of the system's own signal provided in the embodiment to be carried out at the moment of the strongest interference.

The receiving means shown in FIG. 5 can be implemented using prior art device components. The control means, locating means, IRC interference cancellation means, detecting means, and suppressing means according to the preferred embodiments are implemented for example by using software, an ASIC (Application Specific Integrated Circuit) or separate logic components.

Figure 6:
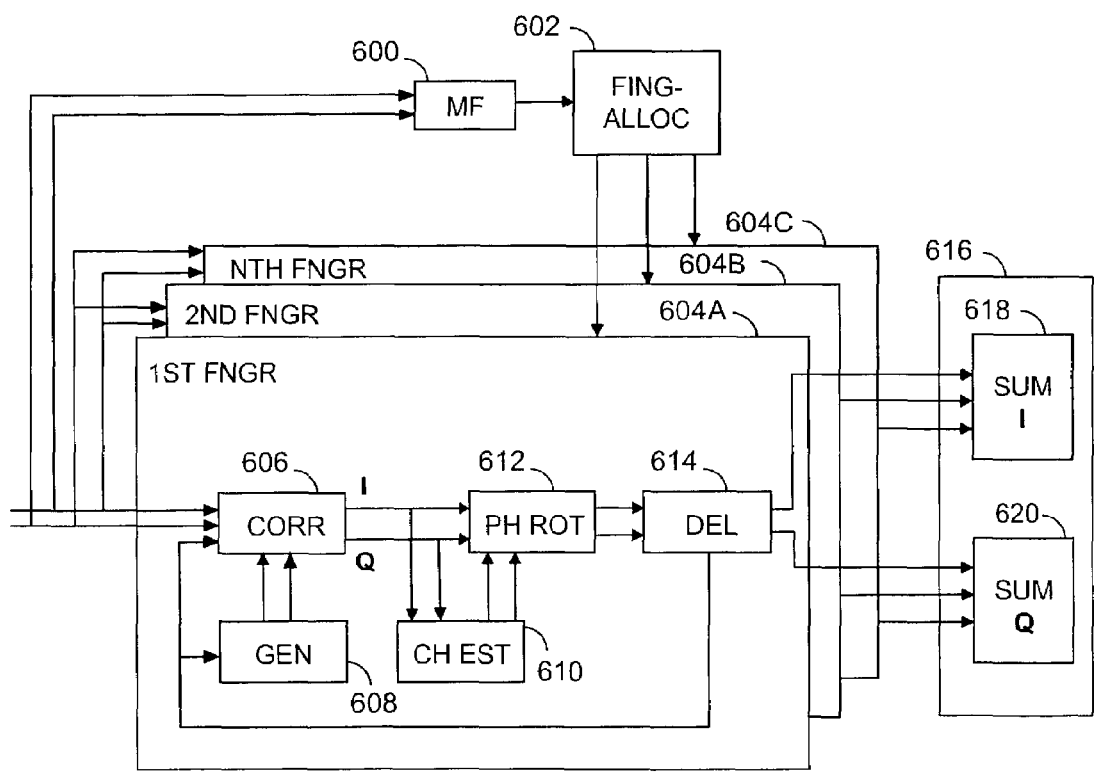
FIG. 6 illustrates a preferred embodiment of a RAKE receiver.

FIG. 6 shows the parts of an embodiment of a RAKE receiver that are relevant to the invention. A conventional CDMA receiver usually contains one to sixteen RAKE fingers, each one of which is responsible for following one multipath propagated component of a received user signal. Due to the mobility of a mobile station, the environment in which a signal propagates between a base station and the mobile station varies constantly, and the strength and number of multipath propagated signals change along with the location of the mobile station. The signal is received at the receiver by one or more antenna receivers and after it has passed the radio frequency parts, it is transferred to an analog-to-digital converter, from where signals modulated by QPSK modulation, for example, and with I and Q fingers separated are obtained.

The multipath propagated components of the signal sampled in the A/D converter are searched for in a searcher, the generation of the impulse response being carried out as a matched filter 600, for example. When a connection is to be set up, the correlator 600 residing in the searcher tends to synchronize with pilot bits spread by means of a spreading code to produce the impulse response. The signal to be received is subjected to a relatively long matched filter 600 in the searcher so as to enable the correct phase of the spreading code to be found as quickly as possible. After being synchronized with the correct phase of the spreading code, the correlator 600 may be shortened to 32 chips, for example, for traffic channel reception.

The searcher further comprises allocation means 602, which determine the delays of the different signal components from the impulse response formed in the matched filter 600 and allocate the components the RAKE receiver fingers 604A-604C are to follow. The allocation means 602 identify the strongest multipath components from the channel impulse response and carry out re-allocation of the fingers 604A-604C, if multipath components stronger than the old ones are found in the channel impulse response. It is also possible to carry out the re-allocation of the fingers 604A-604C at regular intervals. Each finger 604A-604C comprises a correlator 606 and a code generator 608 for spreading one multipath propagated component of the user signal. A channel estimator 610 makes use of the pilot symbols to estimate the state of the channel, this effect being removable from the received symbols by means of a phase rotator 612.

Signal delay is corrected using a delay unit 614, which allows signals received at different RAKE fingers to be synchronized with each other. A combiner 616 provided in the RAKE receiver combines the signals received at the different RAKE fingers 604A-604C to obtain multipath diversity against channel fading. The difference between the combining methods used by combiner 616 is in the weighting of the summation, shown as sum blocks 618 and 620. In a typical RAKE receiver, chip-level processing, such as correlators, code generators and matched filters, are implemented as an ASIC (Application Specific Integrated Circuit), while symbol-level processing, such as channel estimation, phase rotation, and combining, is implemented as DSP (Digital Signal Processing).

Although the invention is described above with reference to an example according to the accompanying drawings, it is obvious that the invention is not restricted to it, but may be varied in many ways within the inventive idea disclosed in the accompanying claims.

The invention claimed is:

1. A method, comprising:
   receiving a signal in a first radio system, a second radio system that employs a time slot structure in data transmission operating on at least partly the same geographical area as the first radio system;
   controlling the cancellation of interference from the signal received to be detected in the first radio system on the basis of the timing employed in the time slot structure of the second radio system;
   locating a time instant of a time slot of the second radio system in the signal received at the first radio system; and
   controlling interference cancellation in the first radio system according to the time instant of the time slot of the second radio system;
   wherein locating the time instant of the time slot of the second radio system in the signal received at the first radio system comprises:
   measuring the power values of the signal received; and
   sliding across the power values a measurement window that is longer than the time slot and providing an averaging across the time slot, until a measurement window location is found where a costs function showing the differences between the power level of the measurement window and the power values of the received signal obtains its optimum value.

2. A method according to claim 1, wherein locating the time instant of the time slot of the second radio system in the signal received at the first radio system comprises:
   measuring the power values of the received signal; and
   locating the time instant of the time slot of the second radio system on the basis of a delay profile formed of the power values.

3. A method according to claim 1, wherein locating the time instant of the time slot of the second radio system comprises finding the best compatibility between the power levels of the signal received at the first radio system and a measurement window of the length of the time slot employed in the second radio system.

4. A method according to claim 1, further comprising:
   locating in the first radio system the location of the time slot of the second radio system, wherein locating includes:
   measuring the power values of the signal received at the first radio system over a particular measurement period;

comparing the measured power values with a ramp filter corresponding to the form of the time slot of the second radio system; and applying the moment when the power values and the ramp filter are best compatible as the time instant of the time slot of the second radio system.

5. A method according to claim 1, further comprising:

detecting in the first radio system the location of the time slot of the second radio system, wherein detecting includes:

measuring the power levels of the signal received at the first radio system over a particular measurement period;

computing a convolution between the measured power levels and the ramp filter corresponding to the form of the time slot of the second radio system; and computing the time instant of the time slot of the second radio system on the basis of the time instant of the maximum convolution value.

6. A method according to claim 1, further comprising:

locating in the first radio system the time slot of the time slot structure of the second radio system that causes the strongest interference;

forming a power ratio by comparing the power of the time slot causing the strongest interference with an average reception power from which the power of the detected time slot of the strongest interference has been cancelled;

restricting the use of the signal to be detected in a receiver during a time division multiple access time slot of the strongest interference if the formed power ratio exceeds a predetermined threshold value.

7. A method according to claim 6, further comprising:

decreasing unfiltered channel estimate values during the time division multiple access time slot of the strongest interference.

8. A method according to claim 6, further comprising:

decreasing symbol estimate values during the time division multiple access time slot of the strongest interference.

9. A method according to claim 1, further comprising:

using an interference rejection combining method for interference cancellation in the first radio system and re-generating a covariance matrix of the interference rejection combining method when an interference time slot of the second radio system is detected in the received signal.

10. A method according to claim 1, further comprising:

using an interference rejection combining method for interference cancellation in the first radio system and synchronizing the computing of the covariance matrix of the interference rejection combining method with the estimated timing of a time division multiple access system.

11. A method according to claim 1, further comprising:

detecting in the first radio system a signal propagated from the second radio system and suppressing the detected signal from the signal received at the first radio system.

12. A method according to claim 1, further comprising:

controlling interference cancellation in the first radio system on the basis of the spatial properties of a signal of the second radio system.

13. A method according to claim 1, wherein the first radio system and the second radio system operate on at least partly overlapping frequencies.

14. A method according to claim 1, wherein the first radio system is a wideband code division multiple access radio system.

15. A computer program embodied on a computer readable medium, the computer program comprising program code for controlling a processor to execute a method comprising:

receiving a signal in a first radio system, a second radio system that employs a time slot structure in data transmission operating on at least partly the same geographical area as the first radio system;

controlling the cancellation of interference from the received signal to be detected in the first radio system on the basis of the timing employed in the time slot structure of the second radio system;

locating a time instant of a time slot of the second radio system in the received signal at the first radio system; and controlling interference cancellation in the first radio system according to the time instant of the time slot of the second radio system;

wherein locating the time instant of the time slot of the second radio system in the signal received at the first radio system comprises:

measuring the power values of the received signal; and sliding across the power values a measurement window that is longer than the time slot and providing an averaging across the time slot, until a measurement window location is found where a costs function showing the differences between the power level of the measurement window and the power values of the received signal obtains its optimum value.

16. An apparatus, comprising:

a signal receiver configured to receive a signal;

a controller configured to control a cancellation of interference from the received signal based on a timing employed in a time slot structure of a second radio system operating on at least partly the same geographical area as a first radio system, wherein the signal receiver and the controller are in the first radio system; and a locator configured to locate a time instant of the time slot of the second radio system in the received signal at the first radio system, and wherein the controller controls interference cancellation in the first radio system on the basis of the time instant of the time slot of the second radio system.

17. The apparatus according to claim 16, wherein the locator is configured to measure the power values of the received signal, and detect the time instant of the time slot of the second radio system on the basis of a delay profile formed of the power values.

18. The apparatus according to claim 16, wherein the locator is configured to find the best compatibility between the power levels of the signal received at the first radio system and a measurement window having one more power levels and a length equal to that of the time slot of the second radio system.

19. The apparatus according to claim 16, wherein the locator is configured to measure the power values of the signal received at the first radio system over a particular measurement period, compare the measured power values with a ramp filter corresponding to the form of the time slot of the second radio system, and apply the moment when the power values and the ramp filter are best compatible as the time instant of the time slot of the second radio system.

20. The apparatus according to claim 16, wherein the locator is configured to measure the power levels of the signal received at the first radio system over a particular measurement period, compute a convolution between the measured power levels and the ramp filter corresponding to the form of the time slot of the second radio system, and compute the time instant of the time slot of the second radio system on the basis of the time instant of the maximum convolution value.

21. The apparatus according to claim 16, wherein the locator is configured to detect in the first radio system the time slot of the time slot structure employed in the second radio system that causes the strongest interference, form a power ratio between the power of the time slot causing the strongest interference and an average reception power from which the power of the detected time slot of the strongest interference has been cancelled, and restrict the use of the received signal to be detected in the signal receiver during the time division multiple access time slot of the strongest interference, in case the formed power ratio exceeds a predetermined threshold value.

22. The apparatus according to claim 21, wherein the controller is configured to restrict the use of the signal to be detected by decreasing unfiltered channel estimate values during the time division multiple access time slot of the strongest interference.

23. The apparatus according to claim 21, wherein the controller is configured to restrict the use of the received signal to be detected by decreasing symbol estimate values during the time division multiple access time slot of the strongest interference.

24. The apparatus according to claim 16, wherein the receiver further comprises:

an interference rejection combining interference cancellator configured to re-generate a covariance matrix of a interference rejection combining method when an interference time slot of the second radio system is detected in the received signal.

25. The apparatus according to claim 16, wherein the receiver further comprises:

an interference rejection combining interference cancellator configured to synchronize the computing of the covariance matrix of an interference rejection combining method with the estimated timing of a time division multiple access system.

26. The apparatus according to claim 16, wherein the receiver further comprises:

an interference rejection combining interference cancellator configured to take into account an interference-causing time slot of the second radio system when carrying out weighting of the antennas of the receiver.

27. The apparatus according to claim 16, wherein the receiver further comprises:

a detector configured to detect a signal belonging to the second radio system; and a suppressor configured to suppress the detected signal from the received signal.

28. The apparatus according to claim 16, wherein the controller is further configured to control the cancellation of interference in the first radio system on the basis of the spatial properties of the second radio system.

29. The apparatus according to claim 16, wherein the first radio system and the second radio system are configured to operate on at least partly overlapping frequencies.

30. The apparatus according to claim 16, wherein the first radio system is a wideband code division multiple access radio system.

31. An apparatus, comprising:

receiving means for receiving a signal;

controlling means for controlling a cancellation of interference from the received signal based on a timing employed in a time slot structure of a second radio system operating on at least partly the same geographical area as a first radio system, wherein the receiving and the controlling are performed in the first radio system;

locating means for locating-the a time instant of a time slot of the second radio system in the received signal at the first radio system; and controlling means for controlling interference cancellation in the first radio system according to the time instant of the time slot of the second radio system;

wherein locating the time instant of the time slot of the second radio system in the signal received at the first radio system comprises:

measuring the power values of the received signal; and sliding across the power values a measurement window that is longer than the time slot and providing an averaging across the time slot, until a measurement window location is found where a costs function showing the differences between the power level of the measurement window and the power values of the received signal obtains its optimum value.

* * * * *